(12) United States Patent
Marmoy et al.

(10) Patent No.: US 7,690,073 B2
(45) Date of Patent: Apr. 6, 2010

(54) WINDSCREEN WIPER DEVICE

(75) Inventors: Didier Marmoy, Margny (BE); Pierre Henin, Bellefontaine (BE); Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 1199 days.

(21) Appl. No.: 10/511,473

(22) PCT Filed: Apr. 29, 2003

(86) PCT No.: PCT/EP03/04702

§ 371 (c)(1),
(2), (4) Date: Aug. 4, 2005

(87) PCT Pub. No.: WO03/093079

PCT Pub. Date: Nov. 13, 2003

(65) Prior Publication Data

US 2006/0021177 A1 Feb. 2, 2006

(30) Foreign Application Priority Data

May 3, 2002 (EP) ................................. 02076754

(51) Int. Cl.
*B60S 1/38* (2006.01)
*B60S 1/40* (2006.01)

(52) U.S. Cl. ............ 15/250.32; 15/250.43; 15/250.451; 29/428; 29/897.2; 29/DIG. 48

(58) Field of Classification Search ............ 15/250.351, 15/250.44, 250.43, 250.32, 250.201, 250.452, 15/250.451, 250.361; 29/428, DIG. 48, 897.2
See application file for complete search history.

(56) References Cited

U.S. PATENT DOCUMENTS

| | | | | |
|---|---|---|---|---|
| 3,254,358 | A | * 6/1966 | Wise | 15/250.32 |
| 3,659,309 | A | 5/1972 | Besnard | 15/250.32 |
| 5,970,569 | A | * 10/1999 | Merkel et al. | 15/250.43 |
| 6,192,546 | B1 | 2/2001 | Kotlarski | 15/250.43 |
| 6,550,096 | B1 | * 4/2003 | Stewart et al. | 15/250.32 |
| 6,966,096 | B2 | * 11/2005 | Baseotto et al. | 15/250.32 |
| 7,055,206 | B2 | * 6/2006 | Boland | 15/250.32 |
| 7,263,741 | B2 | * 9/2007 | Genet et al. | 15/250.32 |

FOREIGN PATENT DOCUMENTS

| DE | 19907629 | * | 8/2000 |
|---|---|---|---|
| WO | WO 01/30622 A1 | | 5/2001 |
| WO | WO 02/04269 A1 | | 1/2002 |

* cited by examiner

*Primary Examiner*—Gary K Graham
(74) *Attorney, Agent, or Firm*—Robert L. Stearns; Dickinson Wright, PLLC

(57) ABSTRACT

A windscreen wiper device (1) comprising an elastic, elongated carrier element, as well as an elongated wiper blade (2) of a flexible material, which can be placed in abutment with a windscreen to be wiped, which wiper blade (2) includes opposing longitudinal grooves (3) on its longitudinal sides, in which grooves (3) spaced-apart longitudinal strips (4) of the carrier element are disposed, wherein neighboring ends of said longitudinal strips (4) are interconnected by a respective connecting piece (6), which windscreen wiper device (1) comprises a connecting device (7) for an oscillating wiper arm (8), wherein said oscillating arm (8) is pivotally connected to said connecting device (7) about a pivot axis near one end, a special feature of which is that said connecting device (7) comprises engaging members (9) being welded to longitudinal sides (10) of said longitudinal strips (4) that face away from each other in such a manner as to withstand shearing forces in a direction along said longitudinal strips (4).

14 Claims, 6 Drawing Sheets

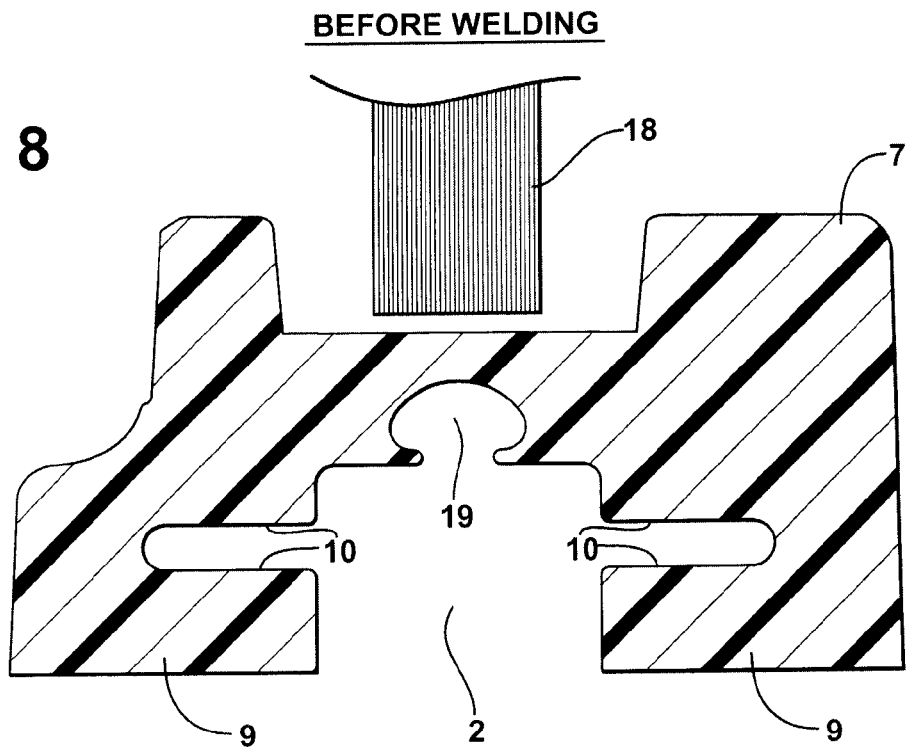
FIG. 8  BEFORE WELDING
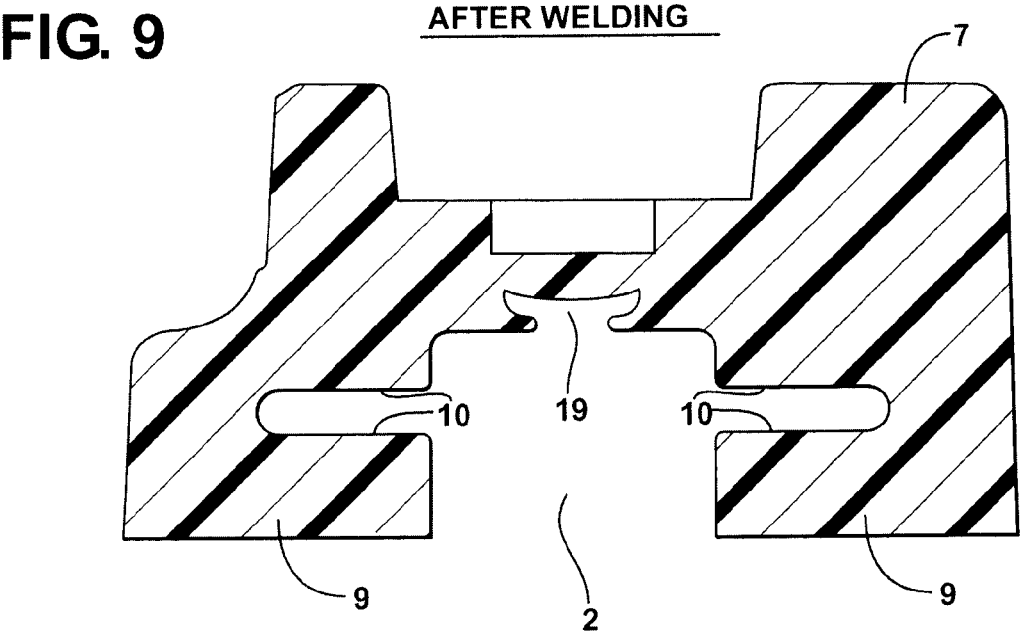
FIG. 9  AFTER WELDING

WINDSCREEN WIPER DEVICE

BACKGROUND OF THE INVENTION

1. Field of the Invention

The invention relates to a windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighbouring ends of said longitudinal strips are interconnected by a respective connecting piece, which windscreen wiper device comprises a connecting device for an oscillating wiper arm, wherein said oscillating arm is pivotally connected to said connecting device about a pivot axis near one end.

2. Related Art

Such a windscreen wiper device is generally known. The prior art windscreen wiper device is in particular designed as a "yokeless" wiper device, wherein use is no longer made of several yokes pivotally connected to each other, but wherein the wiper blade is biassed by the carrier element, as a result of which it exhibits a specific curvature. The oscillating arm of the prior art windscreen wiper device comprises a projecting pin on one side thereof, which is inserted sideways into a through hole of the connecting device.

The connecting device is attached to the unit consisting of the elongate wiper blade and the longitudinal strips through a clamping operation, wherein clamping parts of said connecting device are clamped round longitudinal sides of the strips. In order to lock said connecting device in a direction along the longitudinal strips, said strips are each provided with a recess at their exterior longitudinal side so that the clamping parts of the connecting device rest in said recess. Obviously, cutting such a precisely shaped recess in each longitudinal strip needs additional tools and an extra step in manufacturing said windshield wiper device.

SUMMARY OF THE INVENTION

The object of the invention is to overcome the drawbacks of the prior art as indicated above, in particular to provide a windscreen wiper device wherein the connecting device and the unit consisting of the wiper blade and the strips are interconnected in a durable, solid manner, without the need of additional tools and an extra cutting step in the manufacturing process of the windshield wiper device.

In order to accomplish that objective, a windscreen wiper device of the kind referred to in the introduction is characterized in that said connecting device comprises engaging members being welded to longitudinal sides of said longitudinal strips that face away from each other in such a manner as to withstand shearing forces in a direction along said longitudinal strips. Said engaging members are welded along their entire length to the longitudinal strips or at several points along their length.

In a preferred embodiment of a windscreen wiper device according to the invention the engaging members are welded to said longitudinal sides through an ultrasonic welding operation. To this end, the connecting device and the engaging members are preferably made in one piece of thermoplastic material (whether or not enforced by glass fibers), wherein said longitudinal strips are either entirely made of thermoplastic material as well or provided with a thermoplastic skin. In the latter case the longitudinal strips can be made by co-extrusion of a thermoplastic around a steel wire.

In another preferred embodiment of a windscreen wiper device according to the invention the end of the oscillating wiper arm includes two at least substantially cylindrical protrusions, which form bearing surfaces, at the location of the pivot axis, which protrusions extend in lateral direction with respect to the oscillating wiper arm. In another preferred embodiment the end of the oscillating wiper arm has an at least substantially U-shaped cross-section, said connecting device being partially positioned within said end of the oscillating arm, wherein the end of the oscillating arm is provided, at the location of the pivot axis, with a shaft extending between the legs of the U-shaped cross-section, said shaft pivotally engaging in said connecting device. As a result, the two protrusions/shaft that function(s) as bearing surface(s) is/are spaced far apart, so that the forces that are exerted on said bearing surface(s) will be relatively low. In particular, the protrusions/shaft can be pivotally fitted in correspondingly shaped recess(es) in the connecting device.

In another preferred embodiment of a windscreen wiper device according to the invention, the protrusions/shaft can be snapped into said recess(es).

In another preferred embodiment of a windscreen wiper device according to the invention, the protrusions/shaft are/is dimensioned such that they/it can be passed through (an) insertion opening(s) of the recess(es) from an at least substantially perpendicular position of the oscillating arm with respect to the wiper blade, and be locked in position in said recess(es) from an at least substantially parallel position of the oscillating wiper arm with respect to the wiper blade. This makes it possible to move, in particular pivot, the oscillating wiper arm from a mounting position (that is, a (vertical) position perpendicularly to the wiper blade or the plane of a windscreen to be wiped) to an operative position (that is, a (horizontal) position parallel to the wiper blade or the plane of a windscreen to be wiped). In the mounting position, the protrusions/shaft can be freely inserted into the insertion opening(s) of the recess(es) and subsequently be mounted in said recess(es), whilst in the operative position the protrusions/shaft are/is locked in position in said recess(es), so that they/it cannot move out of said recess(es) via the insertion opening(s).

In another preferred embodiment of a windscreen wiper device according to the invention, the connecting device includes a guide groove for the oscillating wiper arm. Since the oscillating wiper arm is at least partially disposed in said guide groove in the aforesaid operative position, the oscillating wiper arm comprises additional capability of withstanding relatively high torques in that position.

In another preferred embodiment of a windscreen wiper device according to the invention, said connecting pieces are clamping members, which form separate constructional elements. In particular, said connecting pieces are form-locked ("positive locking" or "having positive fit") or force-locked to the adjacent ends of the longitudinal strips.

In another preferred embodiment of a windscreen wiper device according to the invention, said connecting pieces are in one piece with said longitudinal strips.

In another preferred embodiment of a windscreen wiper device according to the invention, at least said longitudinal strips are made of spring band material, preferably steel, coated with a thermoplastic material.

The invention furthermore relates to a method for manufacturing a windscreen wiper device according to the invention, wherein opposing longitudinal grooves are formed in the longitudinal sides of an elongated wiper blade of a flexible material, which can be placed in abutment with a windscreen to be wiped, in which grooves longitudinal strips of a carrier element are subsequently fitted in spaced-apart relationship, wherein neighbouring ends of said longitudinal strips are interconnected by a respective connecting piece, wherein an oscillating arm is pivotally connected to a connecting device of the windscreen wiper device about a pivot axis near one end thereof, characterized in that said connecting device is fitted with engaging members, which are welded to longitudinal sides of said longitudinal strips that face away from each other in such a manner as to withstand shearing forces in a direction along said longitudinal strips.

BRIEF DESCRIPTION OF THE DRAWINGS

The invention will now be explained in more detail with reference to figures illustrated in a drawing, wherein:

FIGS. 8 and 9 refer to a cross-sectional view of the connecting device of the windscreen wiper device of FIG. 1, before and after a preferred additional retention operation to hold said connection device into position, respectively.

DETAILED DESCRIPTION OF THE INVENTION

Figure 1:
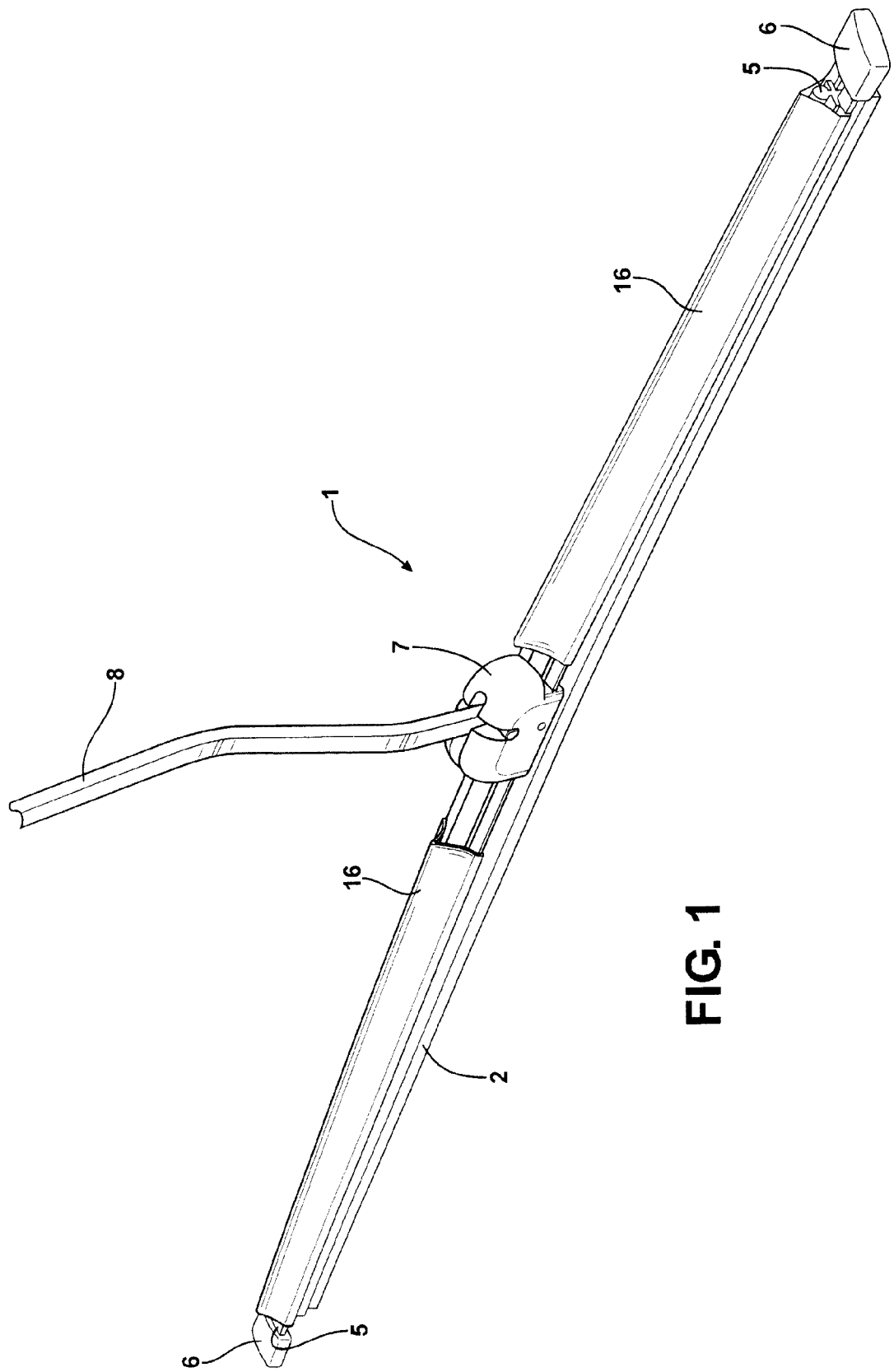
FIG. 1 is a perspective, schematic view of a preferred embodiment of a windscreen wiper device according to the invention.
Figure 2:
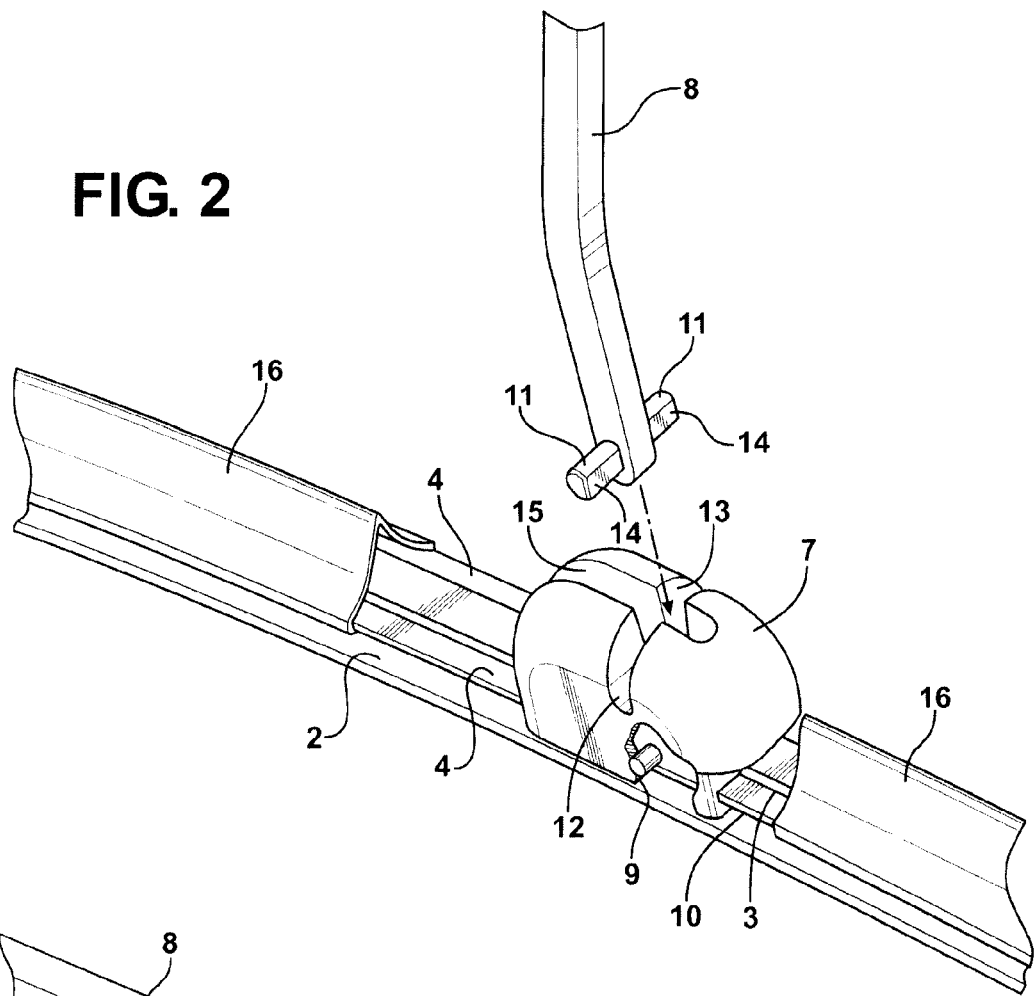
FIGS. 2 and 3 show details of the windscreen wiper device of FIG. 1, wherein various successive steps for fitting an oscillating wiper arm to a connecting device of the windscreen wiper device of FIG. 1.
Figure 3:
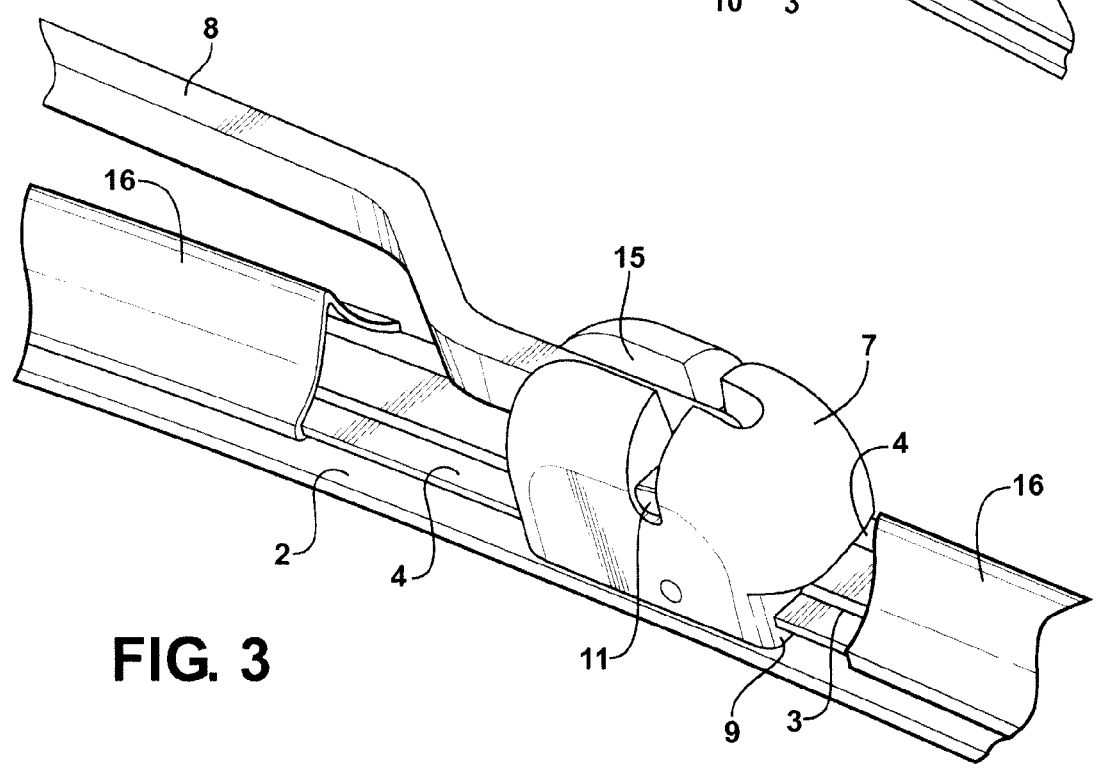

FIGS. 1, 2 and 3 show a preferred variant of a windscreen wiper device 1 according to the invention. Said windscreen wiper device is built up of an elastomeric wiper blade 2, in the longitudinal sides of which opposing longitudinal grooves 3 are formed, and of longitudinal strips 4 made of spring band steel, which are fitted in said longitudinal grooves 3. Said strips 4 form a flexible carrier element for the rubber wiper blade 2, as it were, which is thus biassed in a curved position (the curvature in operative position being that of a windscreen to be wiped). Neighbouring ends 5 of strips 4 are interconnected on either side of the windscreen wiper device 1 by means of connecting pieces 6 functioning as clamping members. In this embodiment, the connecting pieces 6 are separate constructional elements, which may be form-locked ("positive locking" or "having positive fit") as well as force-locked to the ends 5 of strips 4. In another preferred variant, said connecting pieces 6 are in one piece with the strips 4 made of spring band steel. In the latter case said connecting pieces form transverse bridges for the strips 4, as it were.

The windscreen wiper device 1 is furthermore built up of a connecting device 7 of plastic material for an oscillating wiper arm 8. Connecting device 7 comprises engaging members 9 that are integral therewith, which are welded to longitudinal sides 10 of the strips 4 that face away from each other, as a result of which the connecting device 7 is firmly attached to the unit consisting of wiper blade 2 and strips 4. In this respect it is noted that the connecting device 7 is made of a thermoplastic material and the strips 4 are made of steel with a thermoplastic skin (coating). The engaging members 9 engage around said strips 4 or—in other words—said strips 4 are mounted in grooves formed by the engaging members 9. The oscillating wiper arm 8 is pivotally connected to the connecting device 7 about a pivot axis near one end, and that in the following manner. The end of oscillating wiper arm 8 includes two at least substantially cylindrical protrusions 11, which form bearing surfaces, at the location of the pivot axis. Said protrusions 11 can be readily inserted into correspondingly shaped recesses 12 in the connecting device 7 from a vertical position of the oscillating wiper arm 8. This can take place freely from said vertical position, because the width of said protrusions 11 is smaller than that of the insertion openings 13 of the recesses 12 in that position: it so happens that both protrusions 11 have a flat guide surface 14 (FIG. 2). Then the oscillating wiper arm 8 is pivoted through 90 degrees about the pivot axis, from its vertical position to a horizontal position (FIG. 3). In the horizontal position of the oscillating wiper arm 8, the width of said protrusions 11 is smaller than the width of the insertion openings 13 of recesses 12, so that the oscillating wiper arm 8 is locked with respect to the connecting device 7 in that position (FIG. 3). FIGS. 2 and 3 clearly show that the connecting device 7 includes a longitudinal guide groove or guide slot 15, in which the end of the oscillating wiper arm 8 rests in its horizontal position. In another preferred variant, the protrusions 11 can be snapped, that is, clipped into said recesses. Possibly, a spoiler 16 is furthermore provided.

Figure 4:
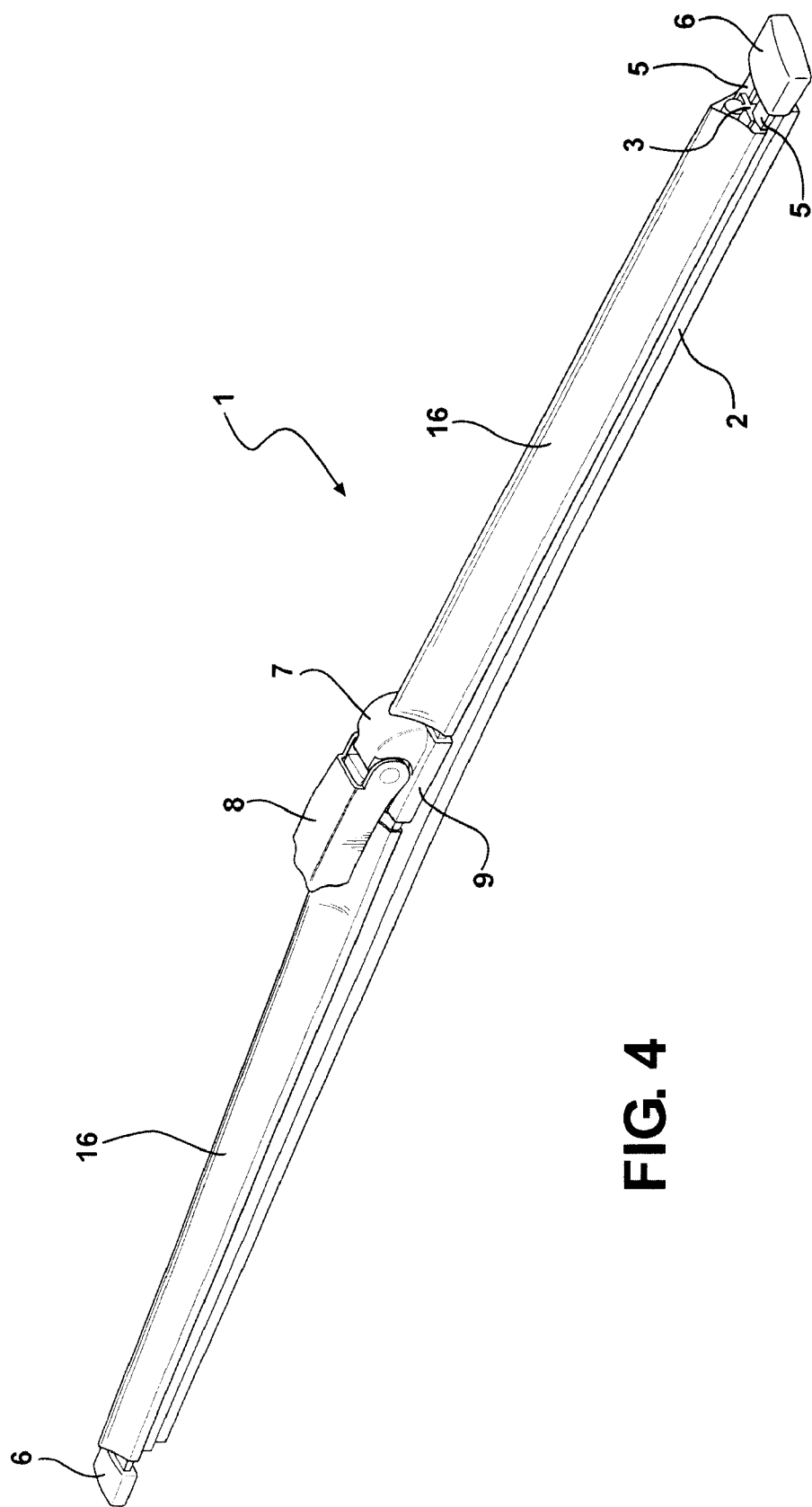
FIGS. 4, 5 and 6 correspond to FIGS. 1, 2 and 3, respectively, but relating to another preferred embodiment.

As already mentioned above, FIGS. 4, 5 and 6 correspond to FIGS. 1, 2 and 3, respectively, but relating to another preferred embodiment, wherein corresponding parts are designated with the same reference numerals.

Figure 5:
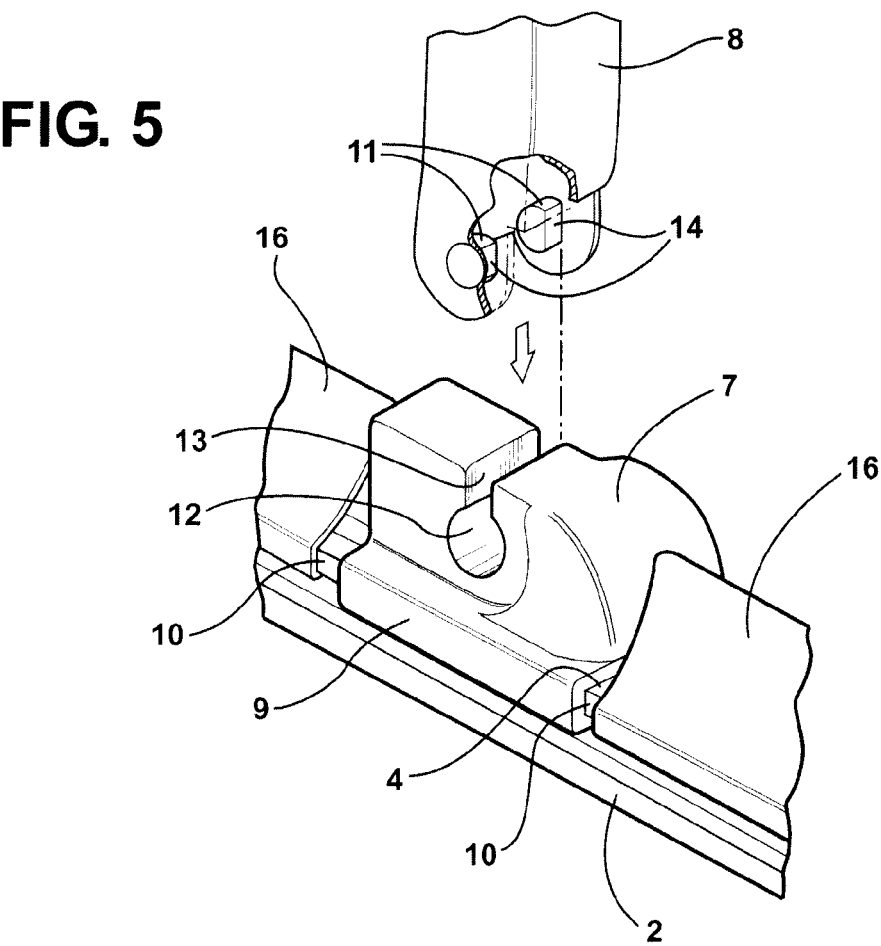
Figure 6:
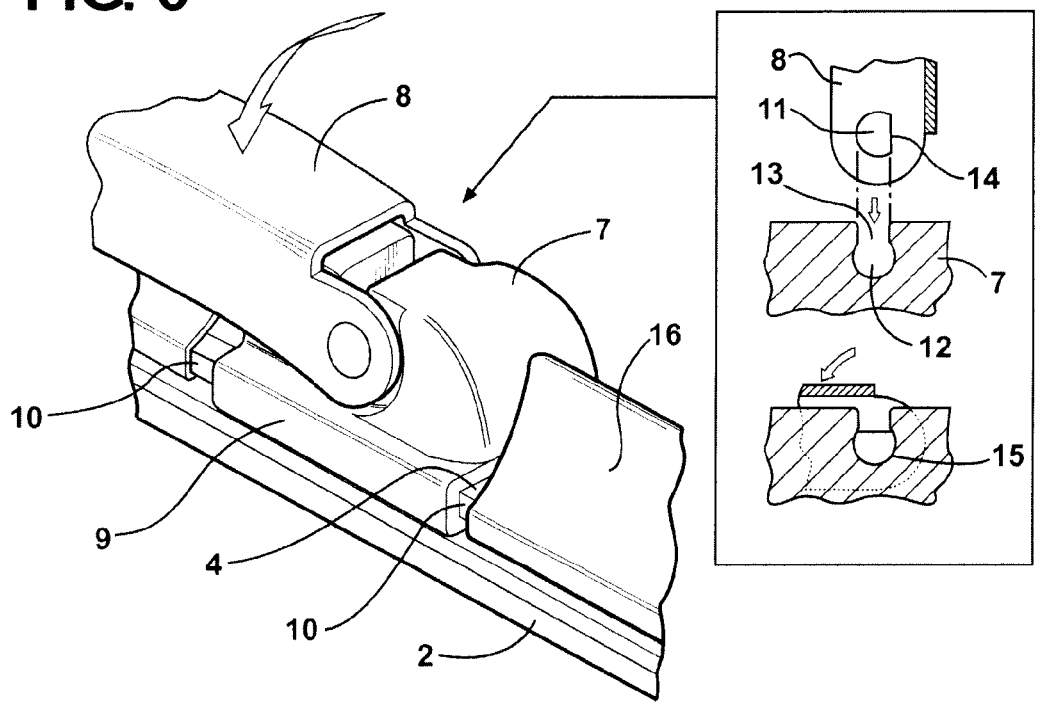

The end of oscillating wiper arm 8 has an at least substantially U-shaped cross-section at the location of its connection to the connecting device 7. On both sides of the legs of the U-shaped cross-section the end of oscillating wiper arm 8 includes two at least substantially cylindrical, inwardly extending protrusions 11, which form cylindrical bearing surfaces, at the location of the pivot axis. Said protrusions 11 can also be readily inserted into a correspondingly shaped recess 12 in the connecting device 7 from a vertical position of the oscillating wiper arm 8. This again can take place freely from said vertical position, because also in this case the width of said protrusions 11 is smaller than that of the insertion opening 13 of the recess 12 in that position: both protrusions 11 have a flat guide surface 14 (FIG. 5). Then the oscillating wiper arm 8 is pivoted through 90 degrees about the pivot axis, from its vertical position to a horizontal position (FIG. 6). In the horizontal position of the oscillating wiper arm 8, the width of said protrusions 11 is larger than the width of the insertion opening 13 of the recess 12, so that the oscillating wiper arm 8 is locked with respect to the connecting device 7 in that position (FIG. 6). In another preferred variant, the protrusions 11 can be snapped, that is, clipped into said recess 12. Instead of one recess 12 as shown, also two recesses (one for each protrusion 11) may be used.

Figure 7:
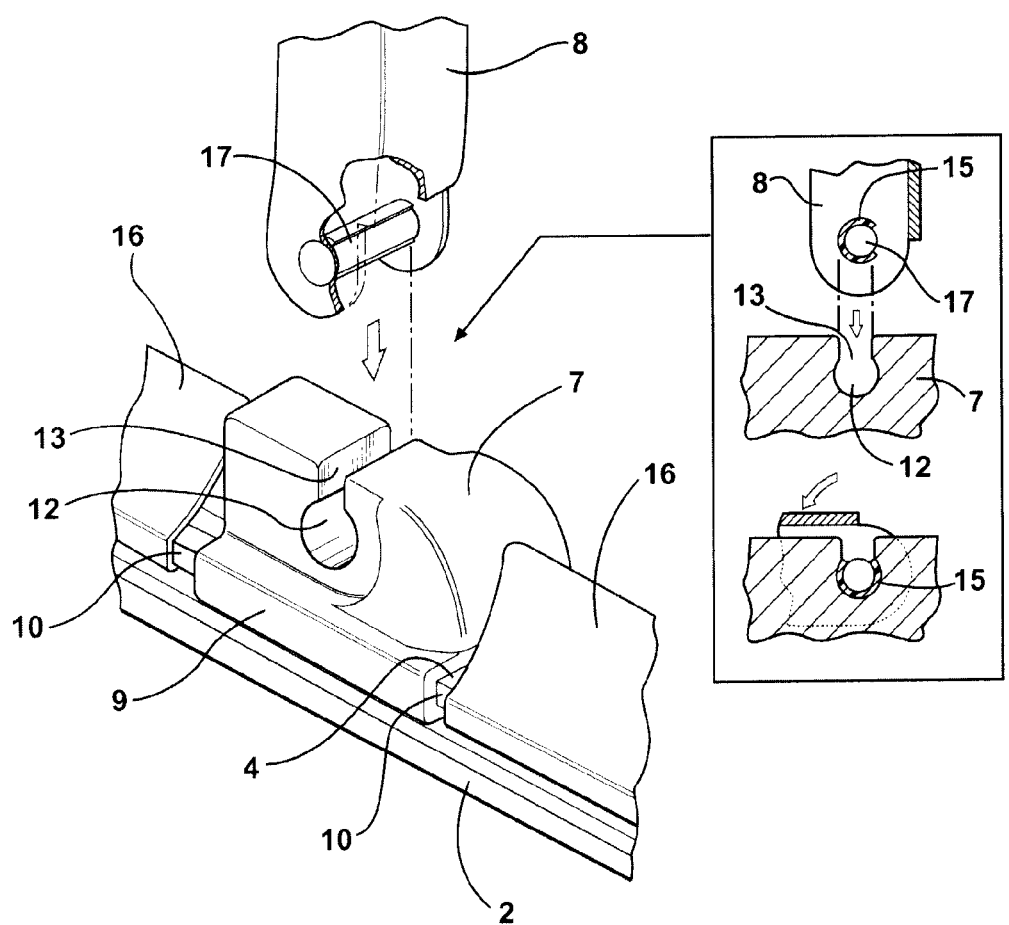
FIG. 7 corresponds to FIG. 5, but relating to a further preferred embodiment.

FIG. 7 corresponds with FIG. 5, wherein parts corresponding with parts of FIG. 5 are designated with the same reference numerals. Instead of two protrusions 11 extending between both legs of the U-shaped cross-section 1, now use is made of a pin 17 extending from one leg to the other leg of the U-shaped cross-section. The way of connecting the oscillating arm 8 to the connecting device 7 is identical to the way described in relation to FIGS. 5 and 6.

In order to prevent the occurrence of wear on protrusions 11 or pin 17, said protrusions or pin are preferably each fitted with a joint part or spacer of a wear-resistant plastic material, which surrounds said protrusions or pin, so that the pivoting movement of connecting device 7 and oscillating wiper arm 8 with respect to each other takes place substantially without friction. Such a joint part is not necessarily mounted entirely around said protrusions or pin: only these parts of said protrusions or said pin that during use make mechanical contact with (parts of) the connecting device 7 are surrounded by a joint part. When using joint parts said protrusions 11 or said pin may have an entirely round form (i.e. without a guide surface), seen in cross-section. Preferably, the end of the oscillating arm 8 that rests in the guide groove 15 shown in FIG. 2 is also surrounded by a joint part or spacer of a wear-resistant plastic material.

In a preferred embodiment the connecting device 7 is firmly retained onto the wiper blade 2 through a retention operation comprising the following steps: a warm stamp 18 is moved downwardly, thus ensuring an (ultrasonic) deformation of the plastic material of the connecting device 7 onto the elastomeric material of the wiper blade 2. In other words, the head 19 of the elastomeric wiper blade 2 is "squeezed" between plastically deformed material of the connecting device 7. FIG. 8 refers to a situation before the welding step of the warm stamp 18, whereas FIG. 19 relates to a situation (ultrasonically) after that welding step.

In another preferred embodiment the connecting pieces 6 designed as separate constructional elements being made of a thermoplastic material are welded to the longitudinal sides 10 of the strips 4 being made of steel with a thermoplastic skin (coating).

The invention is not restricted to the variants as shown in the drawing, but it also extends to other embodiments that fall within the scope of the appended claims.

The invention claimed is:

1. A windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of said carrier element are disposed, wherein neighbouring ends of said longitudinal strips are interconnected by a respective connecting piece, which windscreen wiper device comprises a connecting device for an oscillating wiper arm, wherein said oscillating arm is pivotally connected to said connecting device about a pivot axis near one end, characterized in that said connecting device comprises engaging members being welded to longitudinal sides of said longitudinal strips that face away from each other in such a manner as to withstand shearing forces in a direction along said longitudinal strips, said connecting device and said engaging members being constructed as one piece of thermoplastic material and said longitudinal strips having an outer thermoplastic skin welded to said connecting device.

2. A windscreen wiper device according to claim 1, wherein said engaging members are welded to said longitudinal sides through an ultrasonic welding operation.

3. A windscreen wiper device according to claim 1, wherein said connecting device and said engaging members engage around said longitudinal strips.

4. A windscreen wiper device according to claim 1, wherein the end of the oscillating wiper arm includes two at least substantially cylindrical protrusions, which form bearing surfaces, at the location of the pivot axis, which protrusions extend in lateral direction with respect to the oscillating wiper arm.

5. A windscreen wiper device according to claim 4, wherein said protrusions can be pivotally mounted in correspondingly shaped recesses in the connecting device.

6. A windscreen wiper device according to claim 5, wherein said protrusions can be snapped into said recesses.

7. A windscreen wiper device according to claim 5, wherein said protrusions are dimensioned such that they can be passed through insertion openings of the recesses from an at least substantially perpendicular position of the oscillating arm with respect to the wiper blade, and be locked in position in said recesses from an at least substantially parallel position of the oscillating wiper arm with respect to the wiper blade.

8. A windscreen wiper device according to claim 1, wherein the end of the oscillating wiper arm has an at least substantially U-shaped cross-section, said connecting device being partially positioned within said end of the oscillating arm, and wherein the end of the oscillating arm is provided, at the location of the pivot axis, with a shaft extending between the legs of the U-shaped cross-section, said shaft pivotally engaging in said connecting device.

9. A windscreen wiper device according to claim 1, wherein said connecting pieces are clamping members, which form separate constructional elements.

10. A windscreen wiper device according to claim 9, wherein said connecting pieces are form-locked or force-locked to the adjacent ends of said longitudinal strips.

11. A windscreen wiper device according to claim 1, wherein said connecting pieces are in one piece with said longitudinal strips.

12. A windscreen wiper device according to claim 1, wherein at least said longitudinal strips are made of spring band material.

13. A method for manufacturing a windscreen wiper device, wherein opposing longitudinal grooves are formed in longitudinal sides of an elongated wiper blade of a flexible material, which can be placed in abutment with a windscreen to be wiped, in which grooves longitudinal strips of a carrier element are subsequently fitted in spaced-apart relationship, wherein neighbouring ends of said longitudinal strips are interconnected by a respective connecting piece, wherein an oscillating arm is pivotally connected to a connecting device of the windscreen wiper device about a pivot axis near one end thereof, characterized in that said connecting device is fitted with engaging members, which are welded to longitudinal sides of said longitudinal strips that face away from each other in such a manner as to withstand shearing forces in a direction along said longitudinal strips, further including constructing said engaging members as one piece of thermoplastic material and providing said longitudinal strips with a thermoplastic skin.

14. The method of claim 13 further including welding the thermoplastic material of the engaging members to the thermoplastic skin on the longitudinal strips.

* * * * *